(12) United States Patent
Renforth

(10) Patent No.: US 10,433,522 B2
(45) Date of Patent: Oct. 8, 2019

(54) EXPANDABLE PET CARRIER

(71) Applicant: Doskocil Manufacturing Company, Inc., Arlington, TX (US)

(72) Inventor: Jack Renforth, Azle, TX (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 665 days.

(21) Appl. No.: 15/070,141

(22) Filed: Mar. 15, 2016

(65) Prior Publication Data

US 2017/0265430 A1 Sep. 21, 2017

(51) Int. Cl.
*A01K 1/03* (2006.01)
*A01K 1/02* (2006.01)

(52) U.S. Cl.
CPC ................... *A01K 1/0236* (2013.01)

(58) Field of Classification Search
CPC .. A01K 1/0254; A01K 1/0245; A01K 1/0236; A45C 7/0063; A45C 3/00; A45C 7/0077; A45C 7/0086; A45C 7/0068
USPC ......... 119/453, 496–498, 474; 190/103, 108, 190/111, 107, 109
See application file for complete search history.

(56) References Cited

U.S. PATENT DOCUMENTS

| | | | | |
|---|---|---|---|---|
| 2,851,076 A * | 9/1958 | Stakofsky | ................ | A45C 3/06 150/116 |
| 4,762,210 A * | 8/1988 | Boitani | .................... | A45C 3/00 150/117 |
| 5,307,908 A * | 5/1994 | Shyr | ..................... | A45C 7/0068 190/103 |
| 5,497,919 A * | 3/1996 | Klinger | ................ | A45C 7/0063 190/109 |
| 5,653,318 A * | 8/1997 | Field | ............................ | 190/111 |
| 5,871,280 A * | 2/1999 | Watters | ................ | A01K 5/0114 206/216 |
| 6,015,072 A * | 1/2000 | Young | .................. | A45C 7/0063 190/103 |
| 6,076,485 A * | 6/2000 | Peeples | ................ | A01K 1/0254 119/496 |
| 7,232,018 B1 * | 6/2007 | Salander | .................. | A45C 5/14 190/103 |
| D608,159 S * | 1/2010 | Whitlock | ....................... | D7/607 |
| 7,665,421 B2 * | 2/2010 | Martz | .................. | A01K 1/0254 119/497 |
| 7,802,540 B2 * | 9/2010 | Jakubowski | ......... | A01K 1/0254 119/497 |
| D662,263 S * | 6/2012 | Chau | ............................ | D30/109 |
| D692,661 S * | 11/2013 | Gupton, Jr. | .................... | D3/279 |

(Continued)

*Primary Examiner* — Yvonne R Abbott-Lewis
(74) *Attorney, Agent, or Firm* — Global IP Counselors, LLP

(57) ABSTRACT

A pet carrier includes a bottom panel having a pair of end edges and a pair of side edges, a pair of side panels connected to the side edges of the bottom panel, a pair of end panels connected to the end edges of the bottom panel, and a top panel connected to the pair of side panels and the pair of end panels. The bottom panel, the pair of side panels, the pair of end panels, and the top panel enclose a first interior area when the pet carrier is in a compact configuration. The top panel includes an expandable portion configured to be raised above the pair of side panels and the pair of end panels to form a second interior area greater than the first interior area when the pet carrier is in an expanded configuration.

11 Claims, 11 Drawing Sheets

(56) References Cited

U.S. PATENT DOCUMENTS

| | | | | |
|---|---|---|---|---|
| 8,596,222 B1* | 12/2013 | Campbell | ............ | A01K 1/0236 |
| | | | | 119/474 |
| 8,662,020 B1* | 3/2014 | Tecco | ................... | A01K 1/0245 |
| | | | | 119/497 |
| D705,497 S * | 5/2014 | Renforth | ...................... | D30/108 |
| D717,005 S * | 11/2014 | Skaggs | ........................ | D30/108 |
| D762,384 S * | 8/2016 | Boroski | ......................... | D3/283 |
| D766,571 S * | 9/2016 | Boroski | ......................... | D3/232 |
| 9,635,831 B2* | 5/2017 | Northrop | ............. | A01K 1/0254 |
| 2006/0213452 A1* | 9/2006 | King | ................... | A01K 1/0245 |
| | | | | 119/496 |
| 2008/0245312 A1* | 10/2008 | Leung | ................. | A01K 1/0245 |
| | | | | 119/497 |
| 2010/0175633 A1* | 7/2010 | Krauss | ................ | A01K 1/0254 |
| | | | | 119/497 |
| 2013/0020160 A1* | 1/2013 | Mangano | ................ | A45C 5/14 |
| | | | | 190/18 A |

\* cited by examiner

US 10,433,522 B2

EXPANDABLE PET CARRIER

BACKGROUND

Field of the Invention

The present invention generally relates to a pet carrier with an expandable top portion. More specifically, the present invention relates to a pet carrier with a top panel that is configured to be raised up to expand the interior area available for the pet.

Background Information

Many pet owners travel with their animals on commercial airplanes. These pet owners typically transport their pets in a pet carrier as a carry-on luggage item. However, there are several restrictions on dimensions such as height for carry-on luggage. Therefore, the height of the pet carrier when stowed on an airplane is limited and, thus, it may be uncomfortable for the pet.

Expandable luggage is shown, for example, U.S. Pat. No. 4,773,515. The '515 Patent describes a luggage bag that includes at least one expansible joint to increase the size of the main storage compartment. The compartments at the ends of the luggage bag are provided with a flexible, collapsible membrane that can be extended into the main compartment to provide a large end storage compartment.

SUMMARY

When an owner is carrying a pet around the airport or otherwise using the pet carrier when it is not stowed on an airplane, the height restrictions for carry-on luggage do not apply. Therefore, there is a need for a pet carrier that can expand in height when not being stowed on the airplane to provide more comfort for the pet. It has been discovered that a pet carrier with an expandable top area enables the pet carrier to meet height restrictions while being stowed as a carry-on luggage item on an airplane yet also expand in height to provide more comfort for the pet when the pet carrier is not being stowed on an airplane. In view of the state of the known technology, one aspect of the present disclosure is to provide a pet carrier including a bottom panel, a pair of side panels, a pair of end panels and a top panel. The bottom panel has a pair of end edges and a pair of side edges. The pair of side panels is connected to the side edges of the bottom panel. The pair of end panels is connected to the end edges of the bottom panel. The top panel is connected to the pair of side panels and the pair of end panels. The bottom panel, the pair of side panels, the pair of end panels, and the top panel enclose a first interior area when the pet carrier is in a compact configuration. The top panel includes an expandable portion configured to be raised above the pair of side panels and the pair of end panels to form a second interior area greater than the first interior area when the pet carrier is in an expanded configuration.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 7:
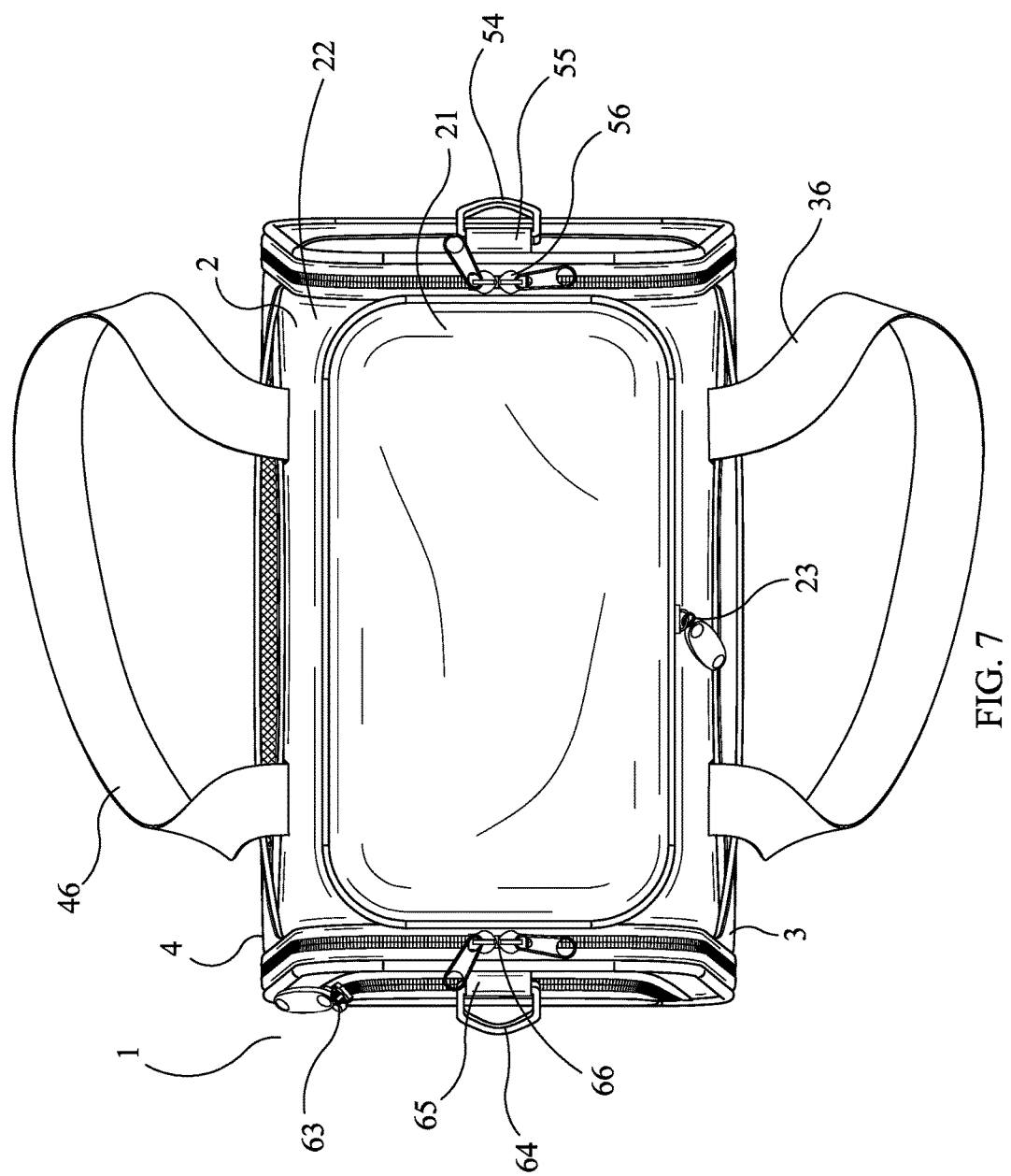
FIG. 7 is a top view of the pet carrier shown in FIG. 1.
Figure 8:
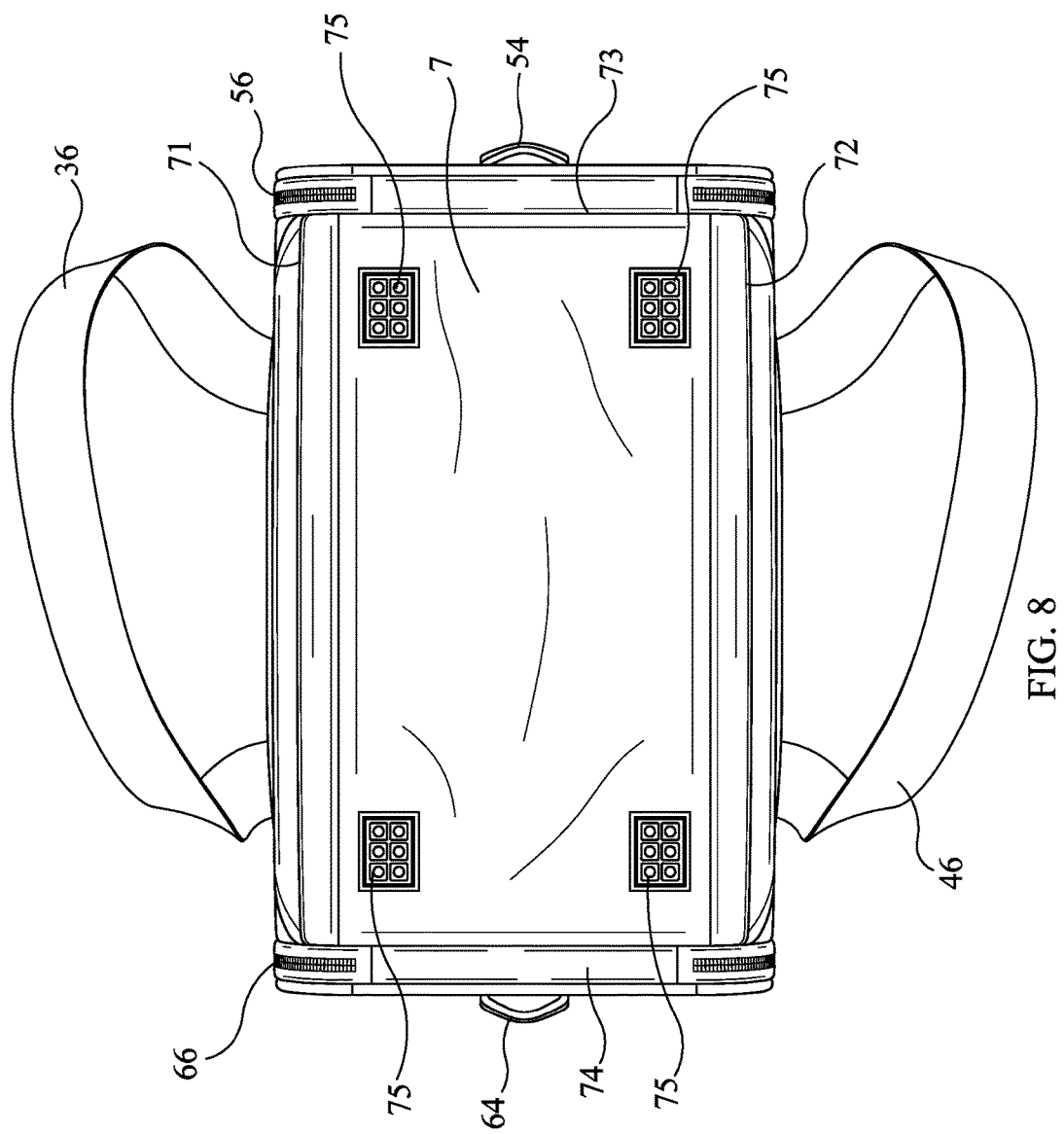
FIG. 8 is a bottom view of the pet carrier shown FIG. 1.
Figure 9:
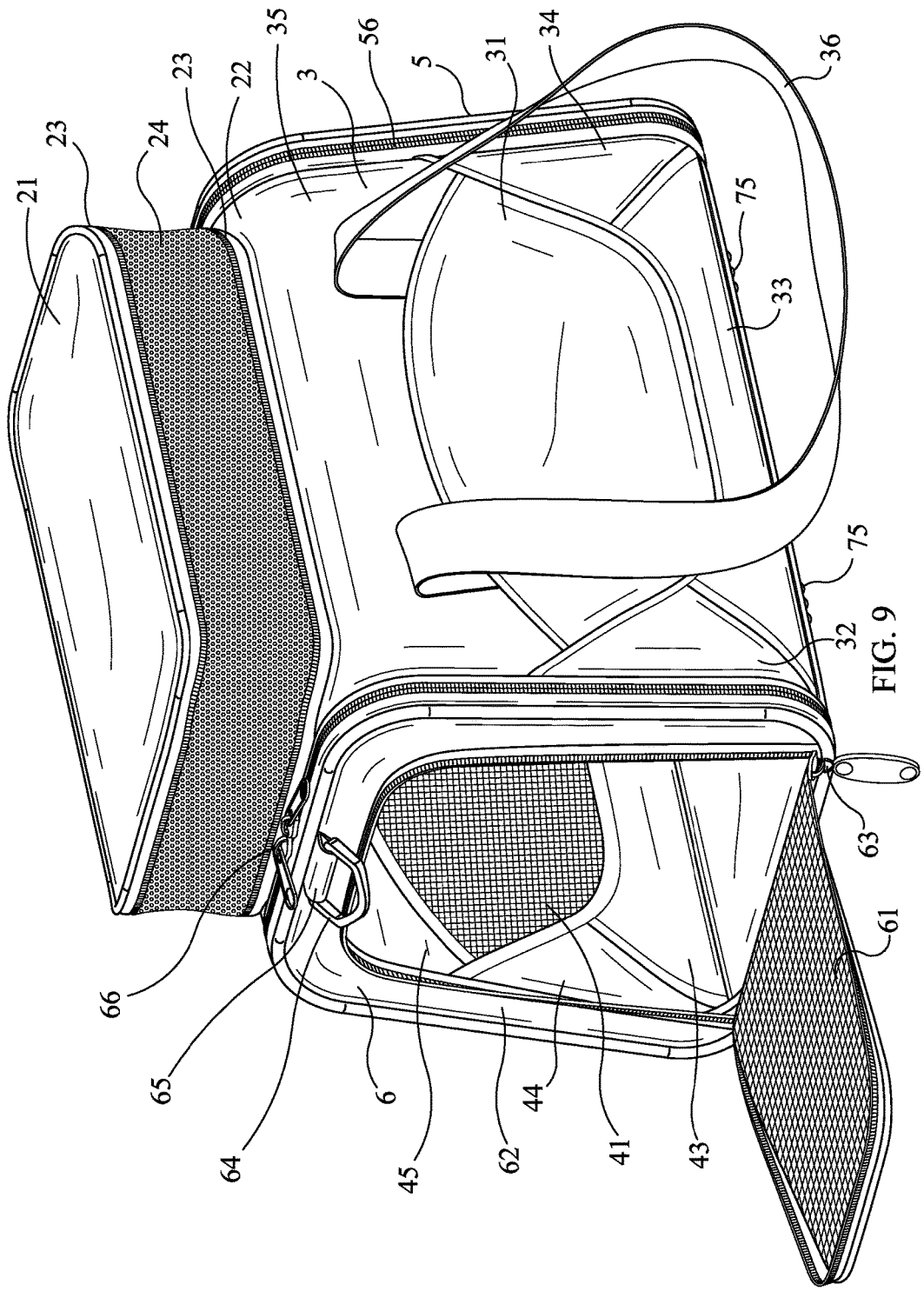
FIG. 9 is a front perspective view of the pet carrier of FIG. 1 in an expanded configuration.
Figure 10:
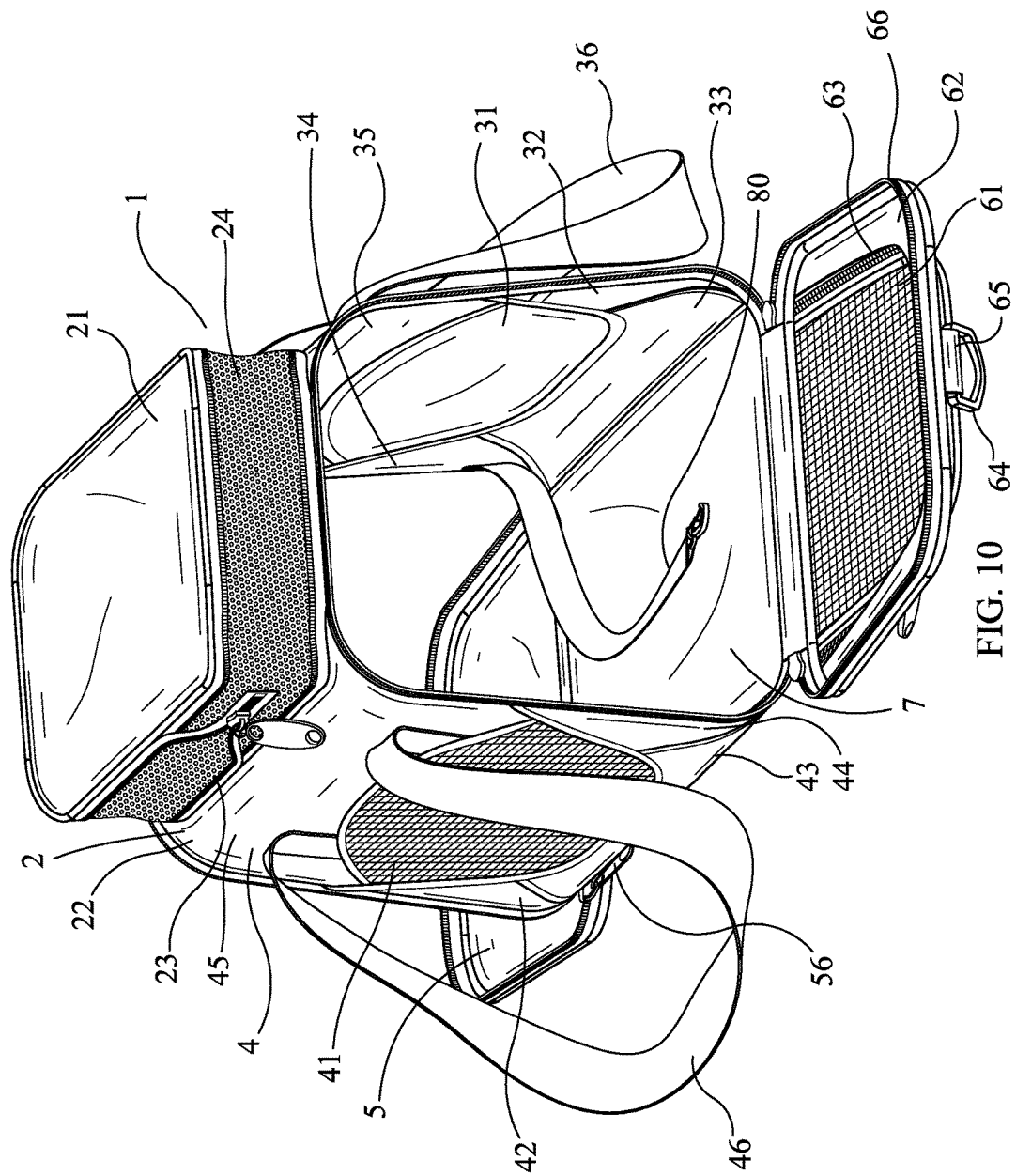
FIG. 10 is a rear perspective view of the pet carrier of FIG. 1 in an expanded configuration.
Figure 11:
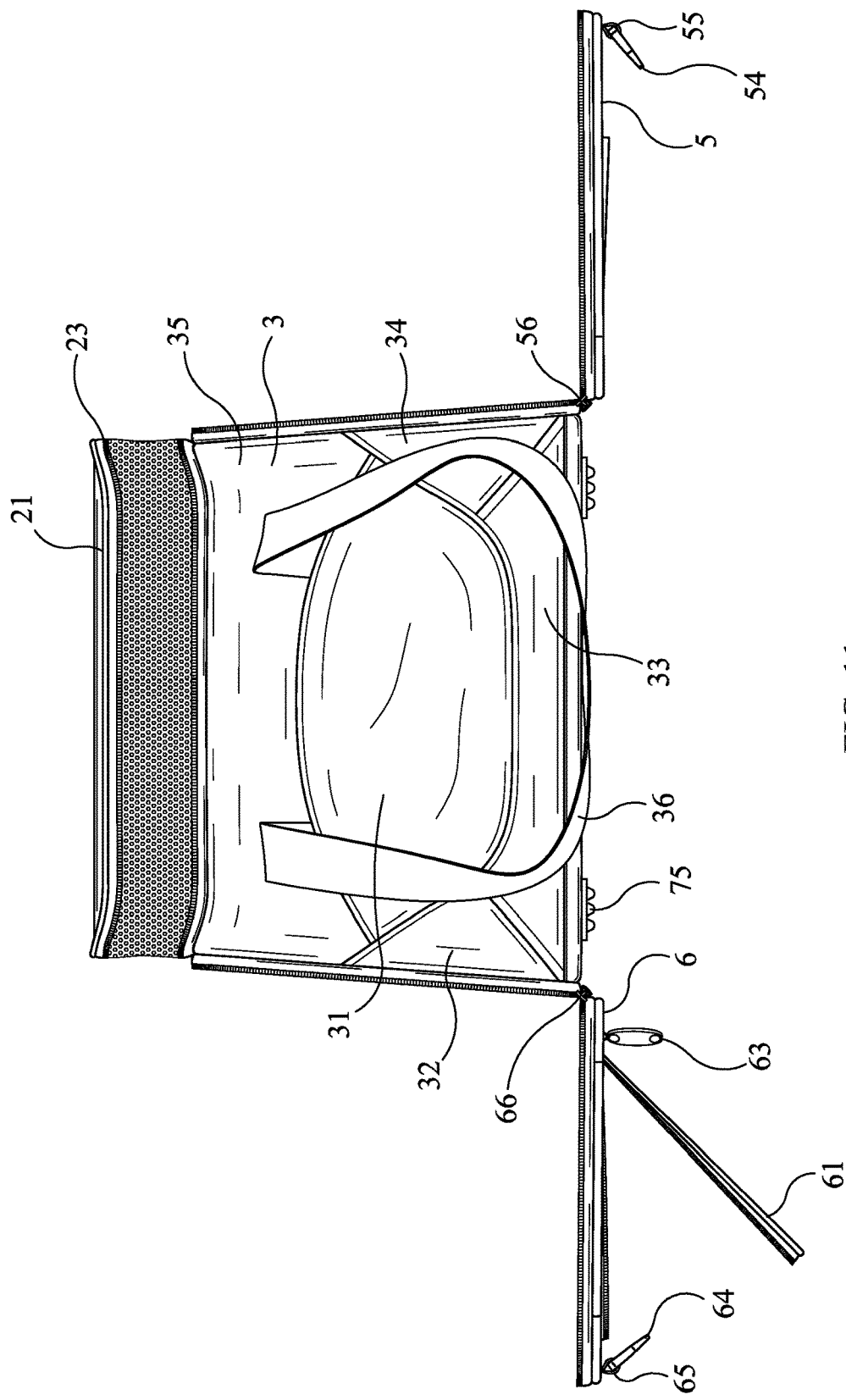
FIG. 11 is a front view of the pet carrier shown in FIG. 10.

Referring initially to FIGS. 1-11, a pet carrier 1 having an expandable top portion 21 is illustrated in accordance with an embodiment. FIGS. 1-8 show the pet carrier 1 in a compact configuration, and FIGS. 9-11 show the pet carrier 1 in an expanded configuration. The pet carrier 1 includes a top panel 2, a pair of side panels 3 and 4, a pair of end panels 5 and 6, and a bottom panel 7. The top panel 2, the bottom panel 7, and the side panel 3, and the side panel 4 each have a substantially rectangular shape. The top panel 2 and the bottom panel 7 have an approximately same size and shape. The side panel 3 and the side panel 4 each have an approximately same size and shape. The end panel 5 and the end panel 6 each have a substantially rectangular shape but may also have a substantially square shape. The end panel 5 and the end panel 6 each have an approximately same size and shape. The top panel 2, the bottom panel 7, and the side panel 3 and the side panel 4 may also each have a larger shape than each of the end panels 5 and 6. The pet carrier 1 is configured to have a size and dimensions suitable for use as a carry-on luggage on a commercial airplane.

Figure 1:
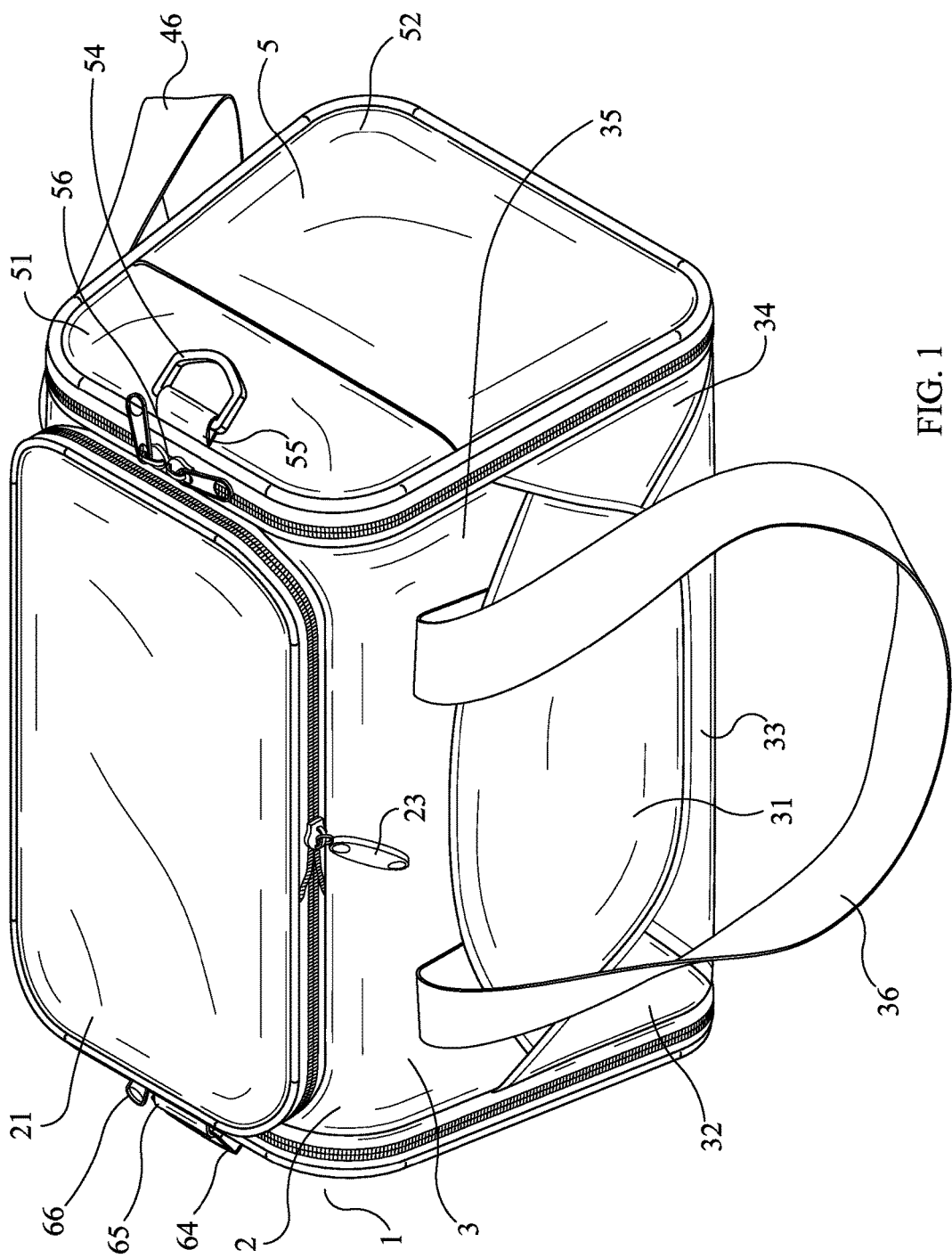
FIG. 1 is a front perspective view of a pet carrier having an expandable top portion in a compact configuration according to an embodiment.
Figure 2:
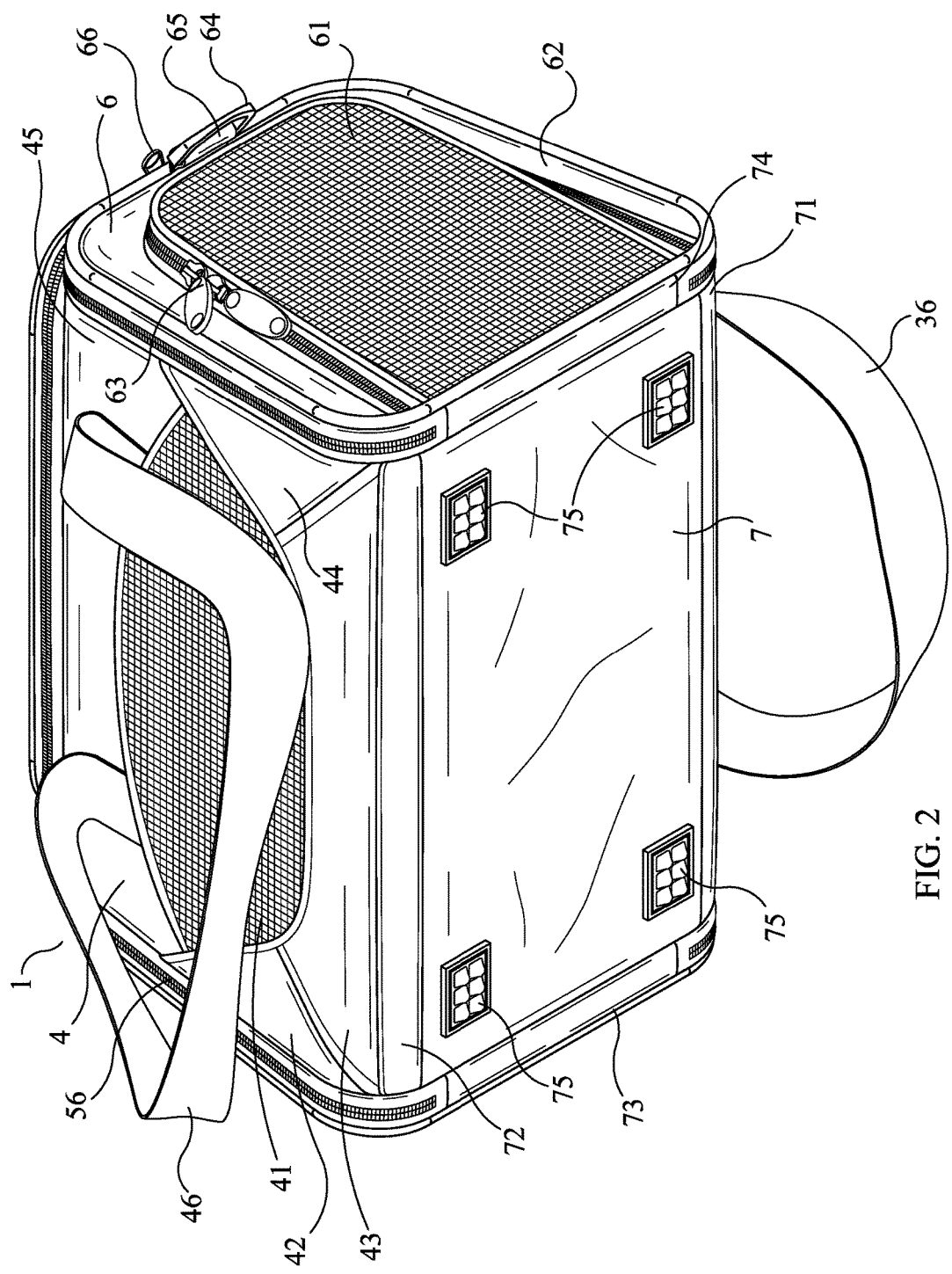
FIG. 2 is a bottom perspective view of the pet carrier shown FIG. 1.

As shown in FIGS. 2 and 8, the bottom panel 7 includes a pair of side edges 71 and 72, a pair of end edges 73 and 74, and a plurality of feet 75. The bottom panel 7 has a substantially rectangular shape. The side edge 71 is connected to the side panel 3, and the side edge 72 is connected to the side panel 4. The end edge 73 is connected to the end panel 5, and the end edge 74 is connected to the end panel 6.

Figure 3:
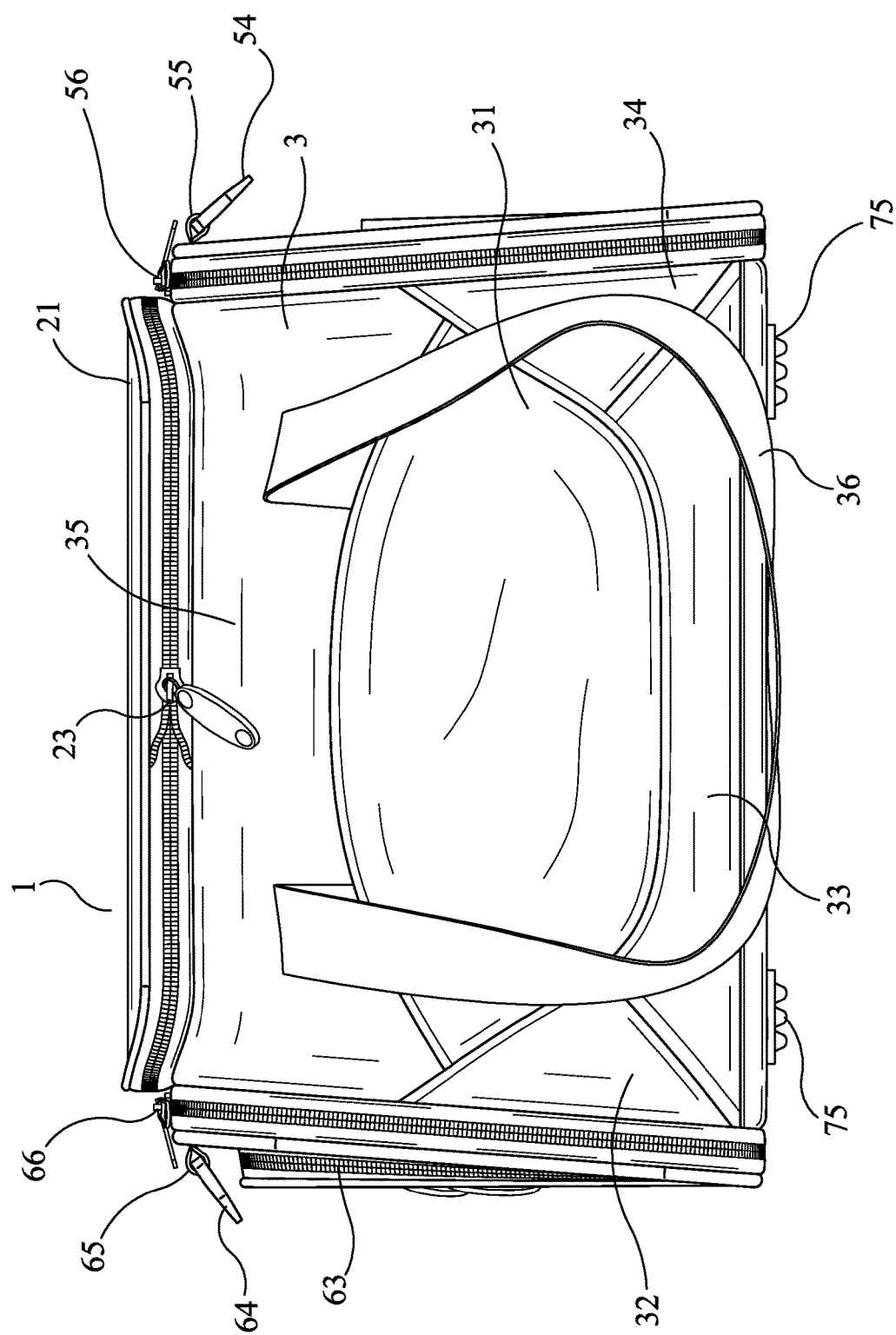
FIG. 3 is a front elevational view of the pet carrier shown in FIG. 1.

As shown in FIG. 3, the side panel 3 includes a first portion 31, a second portion 32, a third portion 33, a fourth portion 34 and a fifth portion 35. Each of the portions 31, 32, 33, 34 and 35 may be formed of any suitable material for an exterior of a pet carrier. Furthermore, the portions 31, 32, 33, 34 and 35 may each be formed of a same material or different materials. A strap 36 is also attached to the side panel 3. The strap 36 is attached to the fifth portion 35 in FIG. 3. However, it will be apparent to those skilled in the art from this disclosure that the strap 36 may be attached to any suitable location on the side panel 3 or on any other panel of the pet carrier 1.

The first portion 31 is attached to the second portion 32, the third portion 33, the fourth portion 34 and the fifth portion 35. The second portion 32 is attached to the first portion 31, the third portion 33 and the fifth portion 35. The third portion 33 is attached to the first portion 31, the second portion 32 and the fourth portion 34. The fourth portion 34 is attached to the first portion 31, the third portion 33 and the fifth portion 35. The fifth portion 35 is attached to the first portion 31, the second portion 32 and the fourth portion 34. It will be apparent to those skilled in the art from this disclosure that the side panel 3 may be configured as a unitary piece of material or may include any number of portions of material joined together.

Figure 4:
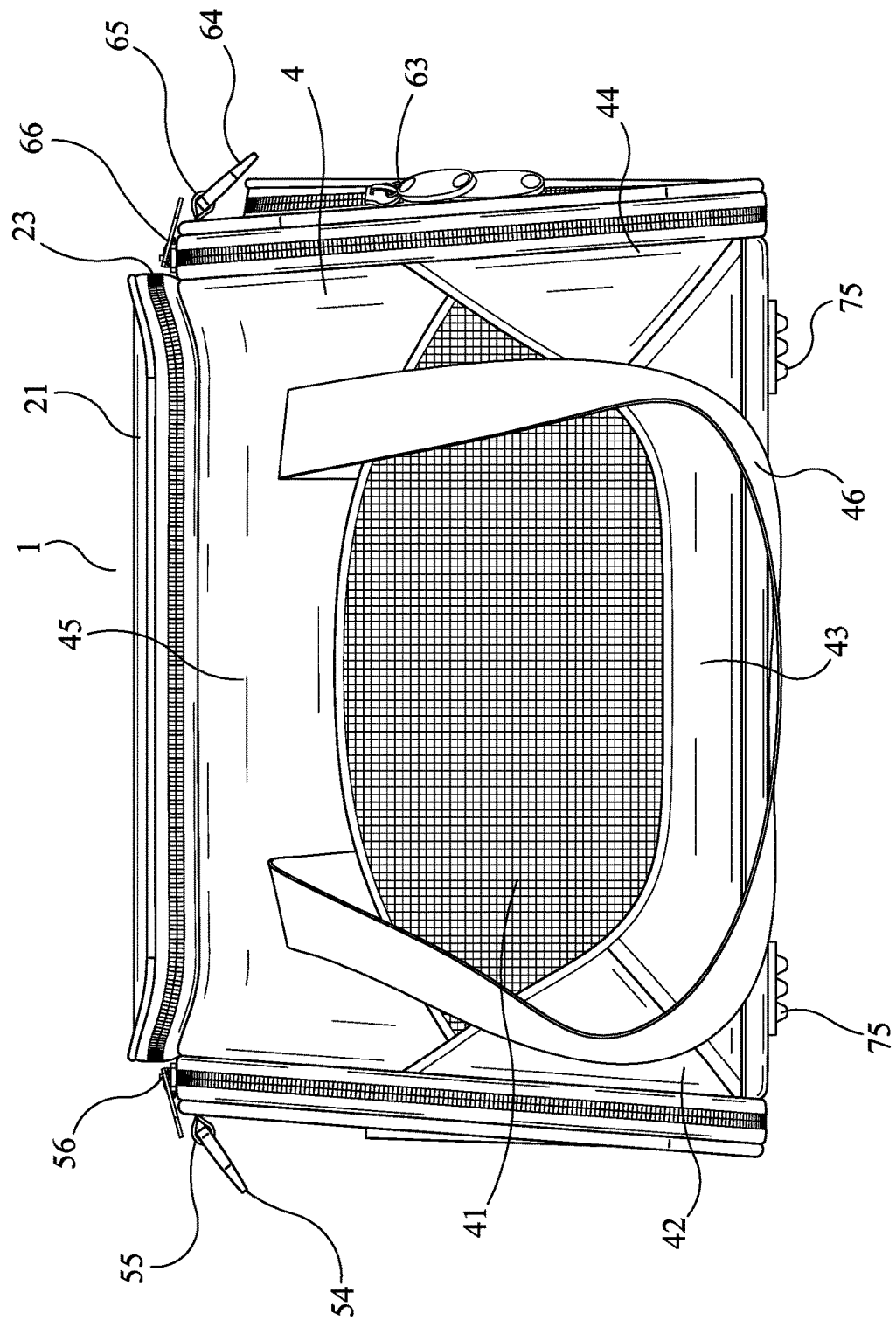
FIG. 4 is a rear elevational view of the pet carrier shown in FIG. 1.

As shown in FIG. 4, the side panel 4 includes a first portion 41, a second portion 42, a third portion 43, a fourth portion 44 and a fifth portion 45. Each of the portions 41, 42, 43, 44 and 45 may be formed of any suitable material for an exterior of a pet carrier. Furthermore, the portions 41, 42, 43, 44 and 45 may each be formed of a same material or different materials. A strap 46 is also attached to the side panel 4. The strap 46 is attached to the fifth portion 45 in FIG. 4. However, it will be apparent to those skilled in the art from this disclosure that the strap 46 may be attached to any suitable location on the side panel 4 or on any other panel of the pet carrier 1.

The first portion 41 is attached to the second portion 42, the third portion 43, the fourth portion 44 and the fifth portion 45. The second portion 42 is attached to the first portion 41, the third portion 43 and the fifth portion 35. The third portion 33 is attached to the first portion 31, the second portion 32 and the fourth portion 34. The fourth portion is attached to the first portion 31, the third portion 33 and the fifth portion 35. The fifth portion 35 is attached to the first portion 31, the second portion the 32 and fourth portion v34. It will be apparent to those skilled in the art from this disclosure that the side panel 4 may be configured as a unitary piece of material or may include any number of portions of material joined together.

Figure 5:
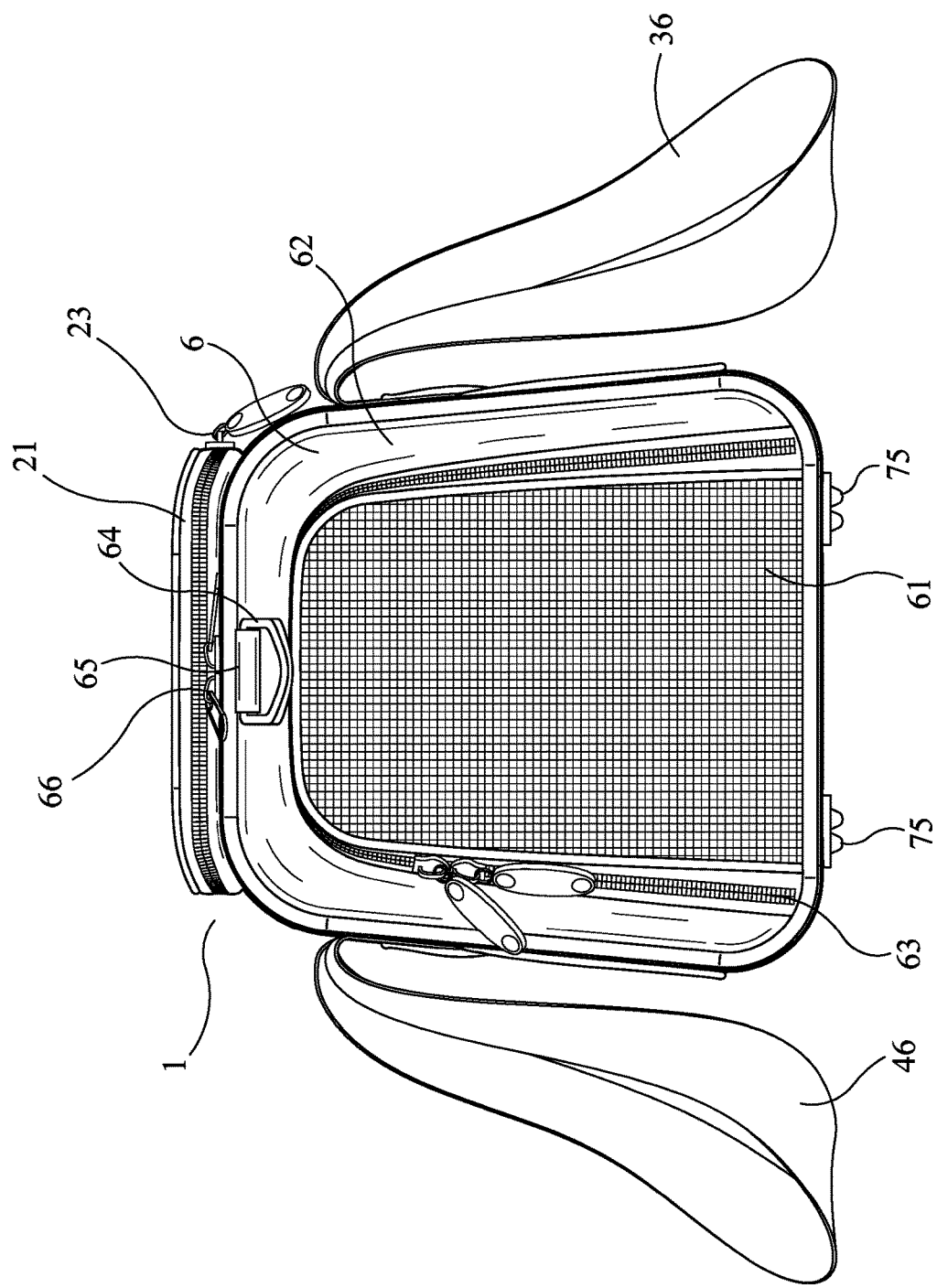
FIG. 5 is a left side elevational view of the pet carrier shown in FIG. 1.

As shown in FIG. 5, the end panel 6 includes the first portion 61 and the second portion 62. Each of the portions 61 and 62 may be formed of any suitable material for an exterior of the pet carrier 1. In FIG. 5, the second portion 62 is formed of a mesh material so that the pet may see outside the pet carrier. However, it will be apparent to those skilled in the art from this disclosure that the second portion 62 may be formed of any other suitable material, and the portions 61 and 62 may be formed of the same material. It will be apparent to those skilled in the art that the end panel 6 may include an additional portion for storing materials. For example, an additional piece of material may be disposed in front of the second portion 62 to create a pouch to store materials.

A clip 64 is disposed on the end panel 6 for attachment of additional items to the pet carrier 1. The clip 64 is attached to the end panel 6 using a piece of material 65 formed into a loop. It will be apparent to those skilled in the art from this disclosure that the clip 64 and the piece 65 may be formed of any materials suitable for attaching additional items to the pet carrier, and the clip 64 and the piece 65 may be replaced with any suitable fastener(s) or component(s) for attaching additional items to the pet carrier 1.

A zipper 63 is disposed between the first portion 61 and the second portion 62 to attach the first portion 61 and the second portion 62. The zipper 63 has a dual slider configuration. However, the zipper 63 may be configured to have a single slider configuration. It will be apparent to those skilled in the art that any suitable component for detachably attaching the first portion 61 and the second portion 62 may be used in place of the zipper 63. Alternatively, the end panel 6 may be configured as a unitary piece of material or may include any number of portions of material joined together.

A zipper 66 is disposed to attach the end panel 6 with the top panel 2, side the panels 3 and 4, and the bottom panel 7. The zipper 66 has a dual slider configuration. However, the zipper 66 may be configured to have a single slider configuration. It will be apparent to those skilled in the art that any suitable component for detachably attaching the end panel 6 with the top panel 2, the side panels 3 and 4 and the bottom panel 7 may be used in place of the zipper 66.

Figure 6:
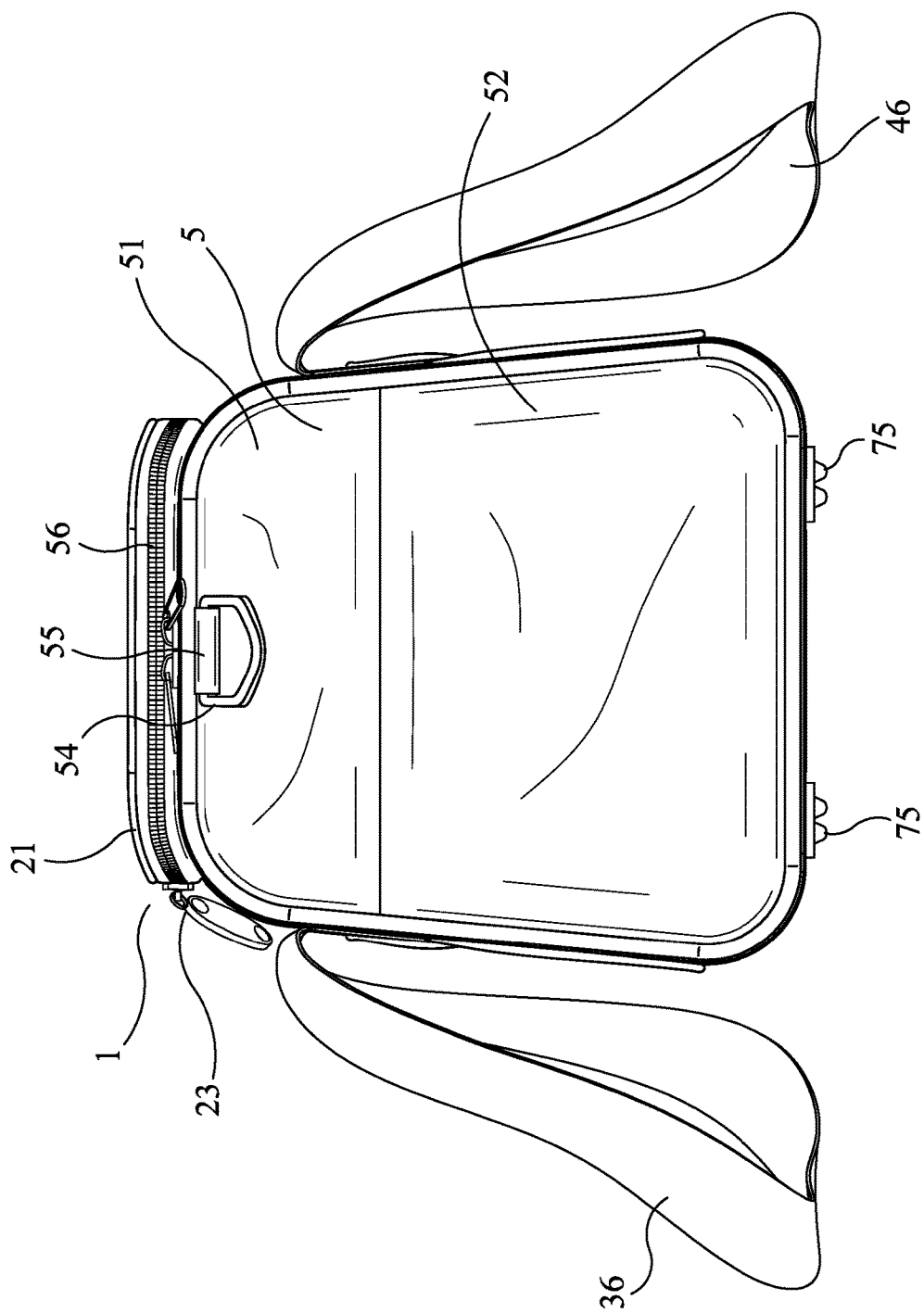
FIG. 6 is a right side elevational view of the pet carrier shown in FIG. 1.

As shown in FIG. 6, the end panel 5 includes the first portion 51 and the second portion 52. Each of the portions 51 and 52 may be formed of any suitable material for an exterior of a pet carrier. Furthermore, the portions 51 and 52 may each be formed of the same material or different materials. For example, one or more of the portions 51 and 52 may be formed of a mesh material so that the pet may see outside the pet carrier. It will be apparent to those skilled in the art that the end panel 5 may include an additional portion for storing materials. For example, an additional piece of material may be provided in front of the second portion 52 to create a pouch to store materials.

A clip 54 is disposed on the end panel 5 for attachment of additional items to the pet carrier 1. The clip 54 is attached to the end panel 5 using a piece of material 55 formed into a loop. It will be apparent to those skilled in the art from this disclosure that the clip 54 and the piece 55 may be formed of any materials suitable for attaching additional items to the pet carrier 1, and the clip 54 and the piece 55 may be replaced with any suitable fastener(s) or component(s) for attaching additional items to the pet carrier.

A zipper 56 is disposed to attach the end panel 5 with the top panel 2, the side panels 3 and 4, and the bottom panel 7. The zipper 56 has a dual slider configuration. However, the zipper 56 may be configured to have a single slider configuration. It will be apparent to those skilled in the art that any suitable component for attaching the end panel 5 to the top panel 2, the side panels 3 and 4 and the bottom panel 7 may be used in place of the zipper 56.

As shown in FIG. 7, the top panel 2 includes an expandable portion 21, a non-expandable portion 22 and a zipper 23 formed around expandable portion 21. The expandable portion 21 and the non-expandable portion 22 may be formed of any suitable materials for an exterior of a pet carrier. Furthermore, the expandable portion 21 and the non-expandable portion 22 may each be formed of a same material or different materials. Although FIG. 7 shows that the expandable portion 21 does not form the entire top panel 2 such that the top panel 2 also includes the non-expandable portion 22, it will be apparent to those skilled in the art that the expandable portion 21 may form the entire top panel 2 such that the non-expandable portion 22 is not provided.

The zipper 23 connects expandable portion 21 with non-expandable portion 23. The zipper 23 has a single slider configuration. The zipper 23 is formed around the entire expandable portion 21 such that the expandable portion 21 may be raised above the non-expandable portion 22, the side panels 3 and 4 and the end panels 5 and 6 in an expanded configuration. The zipper 23 is configured to retain the expandable portion 21 in a compact configuration when the zipper 23 is zipped or closed and allow the expandable portion 21 to be raised above the non-expandable portion 22, the side panels 3 and 4 and the end panels 5 and 6 in an expanded configuration when the zipper 23 is unzipped or opened. However, it will be apparent to those skilled in the art that any suitable component for allowing the expandable portion 21 to be selectively retained in a compact configuration and raised above the non-expandable portion 22, the side panels 3 and 4 and the end panels 5 and 6 in an expanded configuration may be used in place of the zipper 23.

As shown in FIG. 8, the bottom panel 7 includes a pair of side edges 71 and 72 and a pair of end edges 73 and 74. The bottom panel 7 also includes four feet 75. Any suitable material for an exterior of a pet carrier may be used to form the bottom panel 7. Furthermore, any suitable feet may be used for the feet 75. It will be apparent to those skilled in the art that the bottom panel 7 may include no feet or any number of feet 75.

FIGS. 9-11 show pet carrier 1 having an expandable portion 21 in an expanded configuration. The expandable portion 21 is raised above the non-expandable portion 22, the side panels 3 and 4, and the end panels 5 and 6 in the expanded configuration. The expandable portion 21 includes a mesh material 24. It will be apparent to those skilled in the art that the mesh material 24 can be replaced with any suitable material that allows the expandable portion 21 to be raised above the non-expandable portion 22, the side panels 3 and 4, and the end panels 5 and 6.

As shown in FIG. 10, the expandable portion 21 is raised above the non-expandable portion 22, the side panels 3 and 4, and the end panels 5 and 6 by unzipping the zipper 23 when the pet carrier 1 is in the expanded configuration. The mesh material 24 has a height of approximately 30 inches such that the expandable portion 21 is configured to be raised above the non-expandable portion 22, the side panels 3 and 4, and the end panels 5 and 6 by approximately 30 inches. It will be apparent to those skilled in the art that the expandable portion 21 can be configured to be raised any suitable distance above the non-expandable portion 22, the side panels 3 and 4, and the end panels 5 and 6.

As shown in FIG. 10, a leash 80 may be attached to an interior of the pet carrier 1. In FIG. 10, the leash 80 is attached to the fourth portion 34 of side panel 3. However, the leash 80 may be attached to any suitable portion on an interior of the pet carrier 1.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "portion," or "element" when used in the singular can have the dual meaning of a single part or a plurality of parts. Accordingly, these terms, as utilized to describe the present invention should be interpreted relative to a pet carrier having an expandable top portion.

The term "configured" as used herein to describe a component, portion or part of a device means that the component, portion or part is designed to carry out the desired function.

The terms of degree, such as "substantially" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A pet carrier comprising:
    a bottom panel having a pair of end edges and a pair of side edges;
    a pair of side panels connected to the side edges of the bottom panel;
    a pair of end panels connected to the end edges of the bottom panel; and
    a top panel connected to the pair of side panels and the pair of end panels, the bottom panel, the pair of side panels, the pair of end panels, and the top panel enclosing a first interior area when the pet carrier is in a compact configuration,
    the top panel including an expandable portion configured to be raised above the pair of side panels and the pair of end panels to form a second interior area greater than the first interior area when the pet carrier is in an expanded configuration,
    the top panel and the bottom panel having an approximately same size and an approximately same rectangular or square shape,
    the expandable portion being configured to expand above the top panel by an equal amount around a perimeter of the expandable portion, and
    a zipper having a single slider being formed around the perimeter of the expandable portion, the single slider being provided in a middle of the expandable portion with respect to a height of the expandable portion when fully expanded above the top panel.

2. The pet carrier according to claim 1, wherein the expandable portion includes a pair of sides and a pair of edges formed of a mesh material.

3. The pet carrier according to claim 1, further comprising at least one handle.

4. The pet carrier according to claim 3, wherein the at least one handle is provided on at least one of the pair of side panels and the pair of end panels.

5. The pet carrier according to claim 1, wherein at least one of the pair of side panels and the pair of end panels comprises a portion formed of a mesh material.

6. The pet carrier according to claim 5, wherein the portion formed of a mesh material is a mesh window.

7. The pet carrier according to claim 1, wherein the expandable portion is configured to raise the top panel approximately 2.5 inches above the pair of side panels and the pair of end panels.

8. The pet carrier according to claim 1, wherein the top panel is connected to the pair of side panels and the pair of edge panels with a zipper.

9. The pet carrier according to claim 8, wherein the zipper surrounds the entire top panel.

10. The pet carrier according to claim 1, wherein at least one of the pair of side panels is connected to one of the side edges of the bottom panel with a zipper.

11. The pet carrier according to claim 1, wherein at least one of the end panels includes a portion configured to be detachably attached to the pet carrier such that the at least one of the end panels can be opened to an outside of the pet carrier.

\* \* \* \* \*